US008607346B1

(12) United States Patent
Hedge et al.

(10) Patent No.: US 8,607,346 B1
(45) Date of Patent: Dec. 10, 2013

(54) DYNAMIC RESILIENCE FOR INTRUSION DETECTION AND PREVENTION SYSTEMS

(75) Inventors: Raghukrishna Hedge, Bangalore (IN); Lokesh Kumar Donda, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 360 days.

(21) Appl. No.: 12/891,367

(22) Filed: Sep. 27, 2010

(51) Int. Cl.
 *G06F 11/00* (2006.01)
(52) U.S. Cl.
 USPC .............................................. 726/23; 726/11
(58) Field of Classification Search
 USPC ........................................ 726/11–14, 22–25
 See application file for complete search history.

(56) References Cited

U.S. PATENT DOCUMENTS

2009/0077619 A1* 3/2009 Boyce .............................. 726/1

OTHER PUBLICATIONS

Borisov et al. Generic Application-Level Protocol Analyzer and its Language, Feb. 2005, Microsoft Research, pp. 1-15.*

* cited by examiner

*Primary Examiner* — Michael Simitoski
*Assistant Examiner* — Dao Ho
(74) *Attorney, Agent, or Firm* — Shumaker & Sieffert, P.A.

(57) ABSTRACT

This document describes techniques for continuing execution of intrusion detection software when a process exception caused by a protocol decoder is thrown during processing. In one example, a method includes receiving a packet, and processing the packet using intrusion detection software that includes a processing engine and a plurality of protocol decoders. The method also includes detecting an exception that occurs during processing of the packet, identifying a memory location associated with the exception, and determining whether the exception was caused by one of the protocol decoders based on the memory location associated with the exception. The method further includes handling the exception and continuing execution of the intrusion detection software after determining that the exception was caused by one of the protocol decoders. In some implementations, handling the exception may include determining which one of the protocol decoders caused the exception, and disabling the decoder.

21 Claims, 6 Drawing Sheets

US 8,607,346 B1

DYNAMIC RESILIENCE FOR INTRUSION DETECTION AND PREVENTION SYSTEMS

TECHNICAL FIELD

This disclosure relates to computer networks and, more particularly, to facilitating continued processing on a network device.

BACKGROUND

A computer network typically includes a collection of interconnected computing devices that exchange data and share resources. The devices may include, for example, web servers, database servers, file servers, routers, printers, end-user computers, and other devices. The variety of devices may execute a myriad of different services and communication protocols. Each of the different services and communication protocols exposes the network to different security vulnerabilities.

Conventional techniques for detecting network attacks rely on pattern matching and identification of protocol anomalies. For example, an intrusion detection and prevention (IDP) device typically applies regular expressions or sub-string matches to detect defined patterns within a data stream. Multiple patterns may be used in an attempt to improve the accuracy of the attack detection. In order to improve the probability of detecting an attack, the IDP device may attempt to identify the type of software application and protocol associated with the data stream. Based on the identification, the IDP device monitors the data stream to verify that the data steam conforms to accepted procedures for the particular protocol, i.e., that no protocol anomalies occur within the data stream. In addition, the IDP device selects and applies appropriate patterns to the data stream. In this way, the IDP device determines whether the particular data flow constitutes a network attack, such as transmission of a virus, denial of service (DoS) attack, or other malicious activity.

Many IDP devices utilize two separate software components (collectively "IDP software") for detecting and handling network attacks—a processing engine and one or more decoders, each of which may correspond to a different communication protocol or service (e.g., an HTTP decoder, a Telnet decoder, an FTP decoder, etc.). In general, the processing engine reassembles the data stream to form application-layer data, associates the application-layer data with a particular type of application, and invokes an appropriate decoder for analyzing the reassembled data. The decoder analyzes the application-layer data to determine whether the packets represent a security risk.

When either the processing engine or any of the decoders fails during processing, the IDP software, including both the processing engine and the decoders, may crash, which in turn may expose the network to security risks or may cause a network outage for a period of time. Certain external auto-recovery processes may be used to monitor the IDP software, to identify when a crash occurs, and to restart the IDP software following the crash. Such a restart often requires a relatively long period of time to restart the processing engine and the decoders. Moreover, conventional auto-recovery processes are not able to prevent the crash from occurring.

SUMMARY

In general, this disclosure describes techniques for preventing IDP software executing on a network device from crashing when an exception occurs in one of the decoders during processing that would otherwise cause the IDP software to terminate. Although auto-recovery processes may be used in some situations to reduce the amount of time terminated IDP software is offline, even a short outage may be undesirable in certain deployments, e.g., for hosting or running mission critical applications. As such, the techniques described herein relate to dynamically resilient IDP software with an exception handling module that actively monitors the IDP software for exceptions that are caused by any of the decoders of the IDP software, and allows the IDP software to continue normal processing upon the identification and handling of any such exception. Such dynamic resilience to crashes allows the IDP software to remain online and available to protect against network attacks even if one or more of the IDP decoders fails.

In some implementations, the exception handling module may provide dynamic resilience for the IDP software by determining whether an exception that is encountered during processing was caused by one of the decoders of the IDP software, as opposed to being caused by either the processing engine or another process operating on the network device. If the exception was caused by one of the IDP decoders, the exception handling module may handle the exception in an appropriate manner, and the IDP software may be allowed to continue processing incoming packets. For example, in some implementations, the exception handling module may identify that an exception has occurred in the general memory space of the IDP decoders, and may cause the IDP software to jump to a stable stage of the process, such as to a point where the IDP software is preparing to receive the next incoming packet. After the jump, the IDP software may continue processing incoming packets in a normal fashion.

The exception handling module may also identify the particular decoder that caused the exception based on the packet that was being processed when the exception occurred, and may disable that particular decoder to prevent any further exceptions being thrown from the faulty decoder. In such a case, after disabling the decoder, the IDP software may take a predetermined action for any such packets that would otherwise have been analyzed using the disabled decoder. For example, the IDP software may pass through any packets that are associated with the disabled decoder.

In one example, a method includes receiving a packet of a packet flow, and processing the packet using intrusion detection software that includes a processing engine and a plurality of protocol decoders. The method also includes detecting a process exception that occurs during processing of the packet, identifying a memory location associated with the process exception, and determining whether the process exception was caused by one of the plurality of protocol decoders or the processing engine based on the memory location associated with the process exception. The method further includes handling the process exception and continuing execution of the intrusion detection software when the process exception was caused by one of the plurality of protocol decoders. In some implementations, handling the exception may include determining which one of the plurality of protocol decoders caused the process exception, and disabling the decoder.

In another example, a network device includes a network interface to receive a packet of a packet flow, a control unit having one or more processors, a processing engine executing within the control unit to process the packet to determine whether the packet flow represents a network attack, a plurality of protocol decoders dynamically linked to the processing engine, and an exception handling module. The exception handling module executes within the control unit to detect a process exception that occurs during processing of the packet, to identify a memory location associated with the process exception, to determine whether the process exception was caused by one of the plurality of protocol decoders or the processing engine based on the memory location associated with the process exception, and to handle the process exception and continue processing using the processing engine when the process exception was caused by one of the plurality of protocol decoders.

In another example, a computer-readable medium, such as a computer-readable storage medium, contains, e.g., is encoded with, instructions that cause a programmable processor to receive a packet of a packet flow, and process the packet using intrusion detection software that includes a processing engine and a plurality of protocol decoders. The instructions also cause the programmable processor to detect a process exception that occurs during processing of the packet, identify a memory location associated with the process exception, and determine whether the exception was caused by one of the plurality of protocol decoders or the processing engine based on the memory location associated with the process exception. The instructions further cause the programmable processor to handle the process exception and continue execution of the intrusion detection software when the process exception was caused by one of the plurality of protocol decoders.

The techniques of this disclosure may provide several advantages. For example, the techniques may enable IDP software to continue processing data streams even if one or more of the protocol decoders on the IDP device is faulty and would otherwise cause the IDP software to crash. Since the IDP software is prevented from crashing, network outages associated with bringing the IDP software back online may be avoided. In addition, the techniques may provide useful feedback to IDP decoder developers that may allow the developers to make improvements to the decoders in a shorter time frame. Furthermore, the techniques may provide system administrators with useful information and options related to managing the decoders that are active and/or disabled on the IDP device.

The details of one or more implementations are set forth in the accompanying drawings and the description below. Other features, objects, and advantages will be apparent from the description and drawings, and from the claims.

DETAILED DESCRIPTION

Figure 1:
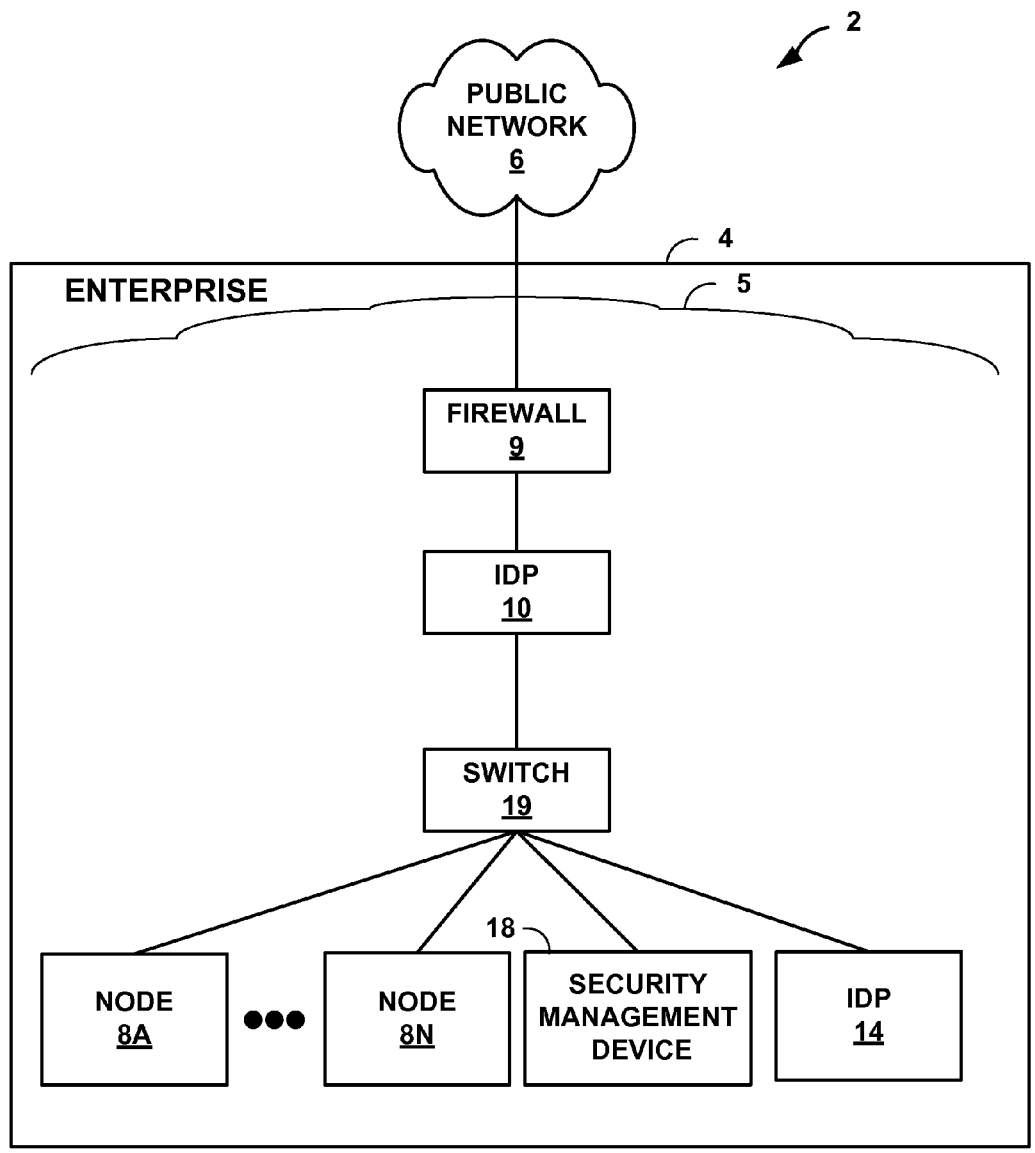
FIG. 1 is a block diagram illustrating an exemplary enterprise computer network in which an intrusion detection and prevention (IDP) device is used to detect and/or prevent network attacks.

FIG. 1 is a block diagram illustrating an exemplary enterprise computer network 4 in which an intrusion detection and prevention (IDP) device 10 may attempt to detect and/or prevent network attacks within network 4. Although this disclosure generally refers to an IDP device, similar techniques may be applied by an intrusion detection system (IDS), an intrusion prevention system (IPS), or the like. In the example of FIG. 1, IDP 10 is a single network device. For example, any of firewall 9, switch 19, security management device 18, IDP 14, or individual ones of nodes 8A-8N, or other devices, such as routers, virtual private network (VPN) appliances or gateways, may perform the functions described with respect to IDP 10.

Network 4 includes a private enterprise computing network 5 that is coupled to public network 6, such as the Internet. Public network 6 may include, for example, one or more client computing devices. Firewall 9 protects private enterprise computing network 5 and, in particular, internal computing nodes 8A-8N (computing nodes 8). Computing nodes 8 represent any private computing device within enterprise computing network 5, for example, workstations, laptops, file servers, print servers, database servers, web servers, e-mail servers, databases, printers, personal digital assistants (PDAs), smart phones, and other devices. Security management device 18 may manage one or more network security devices of enterprise computing network 5, e.g., IDP 10, firewall 9, IDP 14, or one or more of computing nodes 8. In one example, security management device 18 may implement the simple network management protocol (SNMP) to modify settings of the network security devices. Switch 19 directs network traffic to and from destinations within enterprise computing network 5, e.g., one of computing nodes 8, security management device 18, IDP 14, and IDP 10.

In the example of FIG. 1, enterprise computing network 5 includes IDP 10 that monitors traffic flowing between firewall 9 and internal computing nodes 8. In some cases, IDP 10 monitors packets of a packet flow, where the packets further encapsulate sub-packets of encapsulated packet flows, in addition to normal packets. IDP 10 attempts to determine whether a particular network communication represents a network attack. The network communication may comprise a standard packet or an encapsulated sub-packet.

IDP 10 may attempt to identify an application associated with the network communication. IDP 10 may also determine whether the network communication represents a multi-layered application. IDP 10 may also integrate pattern matching with application- and protocol-specific anomaly detection to identify sophisticated attack behaviors. In some implementations, IDP 10 allows the system administrator to specify attack definitions, including compound attack definitions.

The attack definitions may specify, for example, any combination of textual and non-textual (e.g., binary) patterns and/or protocol anomalies to define complex attack signatures. Moreover, IDP 10 may associate particular signatures with protocols of certain applications. For a given communication session intercepted by IDP 10, the IDP may attempt to identify the application type and underlying protocol for the packet flows of the session in order to select one or more attack signatures to apply to the packet flows.

IDP 10 utilizes IDP software that includes a processing engine and one or more decoders to analyze the traffic flows for network attacks. As described in greater detail below, the processing engine may be used to identify packet flows in the monitored traffic, transparently reassemble application-layer communications from the packet flows, and invoke an appropriate decoder. One or more of a set of application-specific protocol-specific decoders within IDP 10 may then be used to analyze the application-layer communications and identify application-layer transactions. The number of protocol decoders installed on IDP devices has generally increased over time, especially as layer 7 has become a transport for more and more protocols, and today, some IDP devices may utilize well over one hundred different protocol decoders. According to the techniques described in this disclosure, the IDP software operating on an IDP device is allowed to continue processing traffic flows even if one or more of the protocol decoders is faulty or otherwise causes a process exception during processing of packets. Considering the proliferation of protocol decoders, many of which may be developed quickly and updated fairly frequently, such functionality may be useful, especially in the case of deployments where even a short network outage is undesirable.

In general, a "transaction" refers to a bounded series of related application-layer communications between peer devices. This disclosure may also refer to a transaction as a network session. For example, a single TCP connection can be used to send (receive) multiple HyperText Transfer Protocol (HTTP) requests (responses). As one example, a single web-page comprising multiple images and links to HTML pages may be fetched using a single TCP connection. An HTTP decoder identifies each request/response within the TCP connection as a different transaction. This may be useful to prevent certain attack definitions from being applied across transaction boundaries. In some implementations, a transaction may be identified according to source and destination IP address, protocol, and source and destination port numbers. Other implementations may identify a transaction in other ways, for example, by using media access control (MAC) addresses.

IDP 10 applies the attack definitions to the protocol-specific anomalies identified by the protocol decoders to detect and prevent network attacks. For example, a system administrator may specify a compound network attack that includes the protocol anomaly of repeated FTP login failure and a pattern that matches a login username of "root." In this manner, the system administrator may combine pattern analysis with protocol anomalies to define complex attack definitions. In the event of a network attack, IDP 10 may take one or more programmed actions, such as automatically dropping packet flows associated with the application-layer communications within which the network attack was detected.

In accordance with the techniques of this disclosure, IDP 10 may be dynamically resilient to crashes of the IDP software that may be caused when an exception or other error occurs in any of the protocol decoders during processing. Rather than allowing the IDP software to terminate due to the exception, IDP 10 may instead be configured to handle the exception and continue normal processing. In some implementations, if an exception is thrown during processing, an exception handling module may determine that the exception originated either directly or indirectly from one of the protocol decoders, and upon such a determination may cause the IDP software to jump to a safe execution point in the processing rather than allowing the processing to continue within the call stack of the protocol decoder. If the processing was instead allowed to continue within the call stack of the protocol decoder, the exception may cause the IDP software, including both the processing engine and the protocol decoders, to terminate. In some implementations, upon identifying an exception thrown by a protocol decoder, the exception handling module may cause the processing to jump out of the protocol decoder call stack, and back to a point in the processing engine that is known to be stable—e.g., at an initial point where the IDP processing engine prepares to receive a next packet that is to be examined.

In some cases, the exception handling module may identify the specific protocol decoder that caused the exception, and may disable that particular protocol decoder for a given period of time or indefinitely, e.g., until the protocol decoder has been updated to fix any errors that caused the exception. Disabling the protocol decoder may, for example, prevent the processing engine from invoking that particular decoder when a packet flow is received that would otherwise be analyzed using the now-disabled protocol decoder. Rather than invoking the disabled protocol decoder, the processing engine may instead perform a predetermined action, such as allowing the packets to pass through, automatically dropping the packets, or some other configurable response. In addition, it should be understood that even when a particular protocol decoder is disabled, the IDP device may continue analyzing other packet flows that are received by the IDP device in a normal manner, e.g., by continuing to invoke appropriate non-disabled protocol decoders.

In some implementations, IDP 10 may maintain a collection (e.g., a list or a database) of protocol decoders that have caused exceptions during execution and/or protocol decoders that have been disabled by the exception handling module. The collection may be used to ensure that, when new policies are created and pushed to IDP 10, e.g., by a system administrator, the protocol decoders that were previously disabled remain disabled. Otherwise, as new policies are pushed to IDP 10, the existing configuration of the device may be overridden, and the faulty protocol decoders may be unintentionally re-enabled.

An administrator of IDP 10 may be allowed to configure certain settings of the exception handling module. As one example, IDP 10 may be configured to respond to an exception thrown by any of the protocol decoders by notifying the administrator of the exception, and automatically disabling the specific protocol decoder that threw the exception. In some implementations, the administrator may also be allowed to manually override one or more of the default behaviors, e.g., through a user interface that prompts the administrator for certain overriding parameters. For instance, the administrator may manually re-enable one of the disabled protocol decoders, or may prevent the decoder from ever being disabled.

In some implementations, the exception handling module may also generate a log message that identifies information about the exception that occurred during processing. The log message may include, for example, information related to the particular protocol decoder that caused the exception, memory stack information that immediately preceded the exception, information about other processes executing at the time of the exception, and other hardware- and/or software-related information that may be useful in analyzing the cause of the exception. The information contained in the log message may be configurable to provide more, less, or different types of information, depending on how the log messages are to be utilized in a given implementation. The log message may then be transmitted to or queried by an appropriate entity, e.g., the developer of the protocol decoder that caused the exception, the system administrator of the IDP device, the network administrator of the network in which the IDP device is deployed, or the like. In some implementations, the log messages may be customized for or otherwise tailored towards the different entities for which the messages are intended.

IDP 10, employing the techniques described herein, may provide several advantages. For example, IDP 10 may continue processing incoming packets of data even if one or more of the IDP decoders has been classified in real-time as faulty and may otherwise cause the IDP software to terminate. IDP 10 may also be configured to provide useful feedback to decoder developers that may allow the developers to make improvements to the decoders in a shorter time frame than if the feedback was not provided. In addition, administrators of IDP 10 may be provided with configurable options and information related to managing the decoders that are active and/or disabled on IDP 10.

Although the techniques of this disclosure are primarily described in the context of dynamically resilient IDP software, the techniques may also be applied in other contexts. For example, the techniques may generally be applied to any session-based packet processing engine that utilizes one or more dynamically loadable services or software modules, e.g., dynamic link libraries (DLLs). As in the case of IDP software as described herein, a memory fault or other exception thrown by one of the dynamically loadable services or software modules may, in the absence of the techniques described herein, cause the session-based packet processing engine to terminate. By implementing the techniques of this disclosure, the session-based packet processing engine may continue processing packets, even if one or more of the dynamically loadable services or software modules fails.

Figure 2:
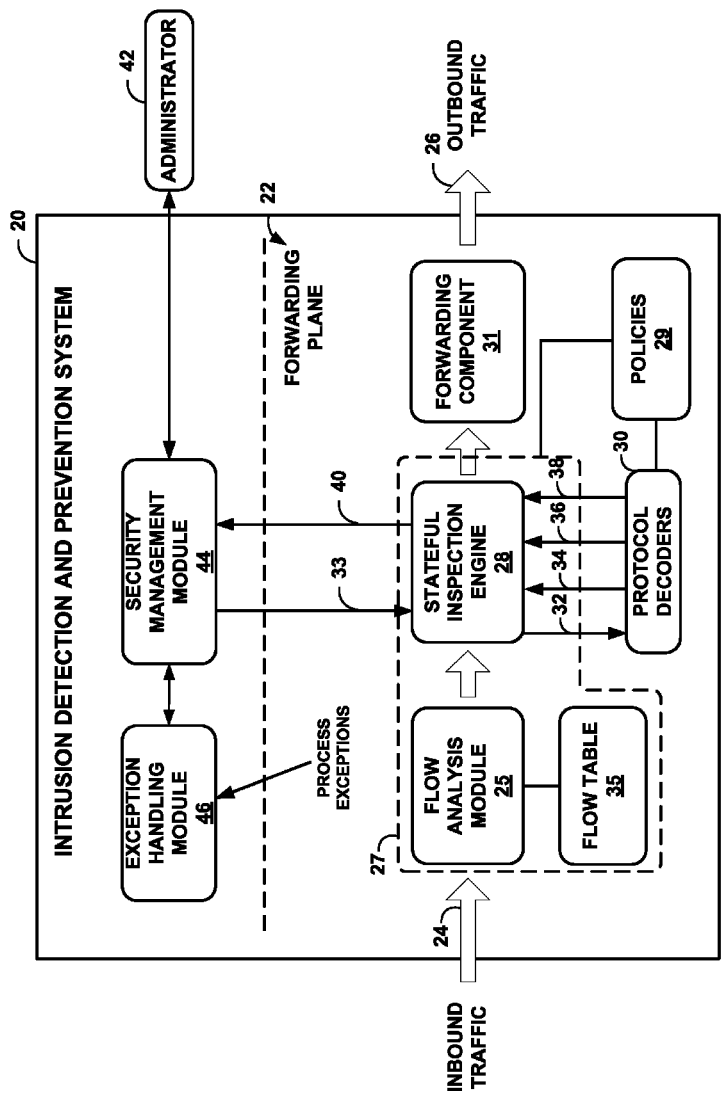
FIG. 2 is a block diagram illustrating an example arrangement of an IDP.

FIG. 2 is a block diagram illustrating an example arrangement of an IDP 20. In the illustrated example, IDP 20 includes a forwarding plane 22 that transparently monitors inbound network traffic 24 and forwards the network traffic as outbound network traffic 26. In the example illustrated by FIG. 2, forwarding plane 22 includes a processing engine 27, which includes a flow analysis module 25, stateful inspection engine 28, and flow table 35. Forwarding plane 22 also includes one or more policies 29, a plurality of protocol decoders 30, forwarding component 31, security management module 44, and exception handling module 46. The example illustrates IDP 20 as a single network device, such as IDP 10 or 14 of FIG. 1. Other examples may implement the functionality of IDP 20 in multiple network devices or in other types of devices, such as security management device 18, switch 19, or firewall 9 of FIG. 1.

Security management module 44 presents a user interface by which administrator 42 configures IDP 20. For example, administrator 42 may configure IDP 20 to monitor particular subnets of the enterprise network. In addition, security management module 44 presents a user interface by which administrator 42 may specify attack definitions 33, which security management module 44 relays to stateful inspection engine 28. In one example, attack definitions 33 comprise compound attack definitions. Moreover, security management module 44 may present a user interface by which administrator 42 may modify assumptions regarding packet flow characteristics, such as the highest priority packet flows for monitoring, port bindings for applications, or other features of determining a type of application and protocol associated with the packet flow. In one example, security management device 18 (FIG. 1) implements the functionality of security management module 44 to enable administrator 42 to program IDP 20 remotely. Security management device 18 may configure IDP 20 via, for example, the simple network management protocol (SNMP) in accordance with a configuration received from administrator 42.

Flow analysis module 25 receives inbound traffic 24 and identifies network flows within the traffic. In one example, flow analysis module 25 includes a network interface (not shown), such as a network interface card (NIC). Each network flow represents a flow of packets in one direction within the network traffic and is identified by at least a source address, a destination address, and a communication protocol. Flow analysis module 25 may utilize additional information to specify network flows, including source media access control (MAC) address, destination MAC address, source port, and/or destination port. Other examples may use additional or different information to identify network flows, such as IP addresses.

Flow analysis module 25 maintains data within flow table 35 that describes each active packet flow present within the network traffic. Flow table 35 specifies network elements associated with each active packet flow, i.e., low-level information such as source and destination devices and ports associated with the packet flow. In addition, flow table 35 identifies pairs or groups of packet flows that collectively form a single communication session between a client and server. For example, flow table 35 may designate communication sessions as pairs of packet flows in opposite directions for flows sharing at least some common network addresses, ports, and/or protocols. According to the techniques of this disclosure, exception handling module 46 may query flow table 35 to determine flow information associated with a packet that was being processed when a process exception occurred.

Stateful inspection engine 28 inspects packet flows to identify attacks within the packet flows. When stateful inspection engine 28 receives a packet as part of a packet flow, a reassembly module (not shown) may buffer the packet in a data buffer. In one example, a data buffer may store data as a sliding window. That is, the data buffer may store data until becoming full or reaching a specified required amount of minimum data for identification. When full, the data buffer may discard certain data to make room for storing new data. In one example, a data buffer stores and discards data according to a first-in, first-out (FIFO) protocol wherein the first data to be stored is the first data to be discarded when the data buffer becomes full. In another example, a data buffer discards data according to a least recently used protocol wherein, when the data buffer is full, the packet flow which has been least recently used will be discarded to make room for new data to be stored.

In one example, a reassembly module of stateful inspection engine 28 may be used to associate packets in a packet flow of a network session according to the 5-tuple {source IP address, destination IP address, protocol, source port, destination port}. Other examples use other methods to associate packets with a particular packet flow or encapsulated packet flow. In one example, IDP 20 comprises part of a network that utilizes virtual local area networks (VLANs). In such an example, a reassembly module may associate packets with a specific packet flow according to a VLAN identifier in addition to the 5-tuple information within the packets.

Stateful inspection engine 28 may also include an attack detection module (not shown) that applies attack definitions 33 to application-layer elements 36 and protocol anomaly data 38 received from protocol decoders 30. The application-layer elements 36 may comprise elements of non-encapsulated packet flows or encapsulated packet flows. That is, the attack detection module may detect network attacks in either normal, non-encapsulated network traffic or in encapsulated packet flows. For each of attack definitions 33, the attack detection module may select one or more patterns specified by the attack definition and determine whether any of application-layer elements 36 match the defined patterns. Each of the patterns may be defined as a respective "regular expression," which generally refers to a formula that is used to match patterns within data.

In addition to determining whether the defined patterns are present, the attack detection module may determine whether any protocol anomalies detected by protocol decoders 30 match the protocol anomalies specified by attack definitions 33. The attack detection module may determine that the corresponding packet flow matches one of attack definitions 33 when both the patterns and protocol anomalies specified by the attack definition are detected within a given communication session. Further, each of attack definitions 33 may specify whether the pattern matching and protocol anomalies must be satisfied on a per-transaction basis or over the lifetime of the communication session.

When stateful inspection engine 28 detects an attack, stateful inspection engine 28 executes a programmed response. Example programmed responses may include, for example, sending alert 40 to security management module 44 for logging and further analysis, and/or instructing forwarding component 31 to drop packets of the packet flow or to end the network session corresponding to the packet flow. In some implementations, alert 40 may include details such as a source address of the packet flow, an identification of the application corresponding to the packet flow, the information that led stateful inspection engine 28 to conclude that a particular network session was malicious, or other information regarding the network session.

IDP 20 may also record an identifier of at least one of the network devices participating in the network session in flow table 35 and block future connection requests originating from the recorded identifier. That is, flow analysis module 25 may receive a connection request, determine that the connection request originates from the identifier recorded in flow table 35, and block the connection request. In this manner, IDP 20 may block future connection requests from the network device participating in the network session as the programmed response. Forwarding component 31 may also construct a message to send to other network devices, such as other routers or IDP, IDS, or IPS devices, to block or otherwise respond to packet flows from the source network device for which stateful inspection engine 28 detected an attack.

IDP 20 may use a minimum data size of the reassembled TCP segments, in addition to the signature, in order to identify applications corresponding to packet flows or encapsulated packet flows. Certain applications require a minimum amount of data, so IDP 20 may distinguish malicious packet flows by determining whether the packet flow contains enough data for the identified protocol. Moreover, IDP 20 may not necessarily recognize every application. In one example, when an application is unknown, IDP 20 may simply forward the packet flow. Other examples may take other actions for unidentified applications, such as discarding all packets which target unknown applications or applying a default signature to all packet flows associated with unknown application types.

In some implementations, stateful inspection engine 28 includes a co-processor to perform application identification. The co-processor may continually receive input in the form of the packet flow and may constantly perform application identification on the packet flow. For each chunk of the packet flow, the co-processor may return the identity or identities of the application(s) that the co-processor identified.

Stateful inspection engine 28 invokes one or more of protocol decoders 30 to analyze the application-layer communications 32 based on the identified type of applications identified for the packet flow. For example, stateful inspection engine 28 may select a single one of protocol decoders 30 in the event the stateful inspection engine determines that the packet flow originated from a single application-layer software application that relied exclusively on layer 4 transport for the application-layer data. As another example, stateful inspection engine 28 may select and apply multiple protocol decoders in the event it determines that the packet flow originated from multiple stacked application-layer software applications, i.e., that at least one application-layer software application is using another application-layer software application as a transport for its application-layer data. In this situation, stateful inspection engine 28 may construct a stack of protocol decoders for layered processing and decoding of the packet flow.

In general, protocol decoders 30 are shared libraries that are utilized by processing engine 27, which executes within user space on a network device, e.g., IDP 10. Protocol decoders 30 may be linked to processing engine 27 as dynamically loadable services or software modules, e.g., dynamic link libraries (DLLs), that also execute in the user space of the network device. Due to the linked nature of the architecture, a process exception that occurs during processing of a packet by one of protocol decoders 30 may generally cause the IDP software, including processing engine 27, to terminate. However, in accordance with the techniques of this disclosure, when a process exception occurs in one of protocol decoders 30, exception handling module 46 may handle the exception gracefully and allow the IDP software to continue processing packets without terminating.

IDP 20 also includes policies 29 that configure how processing engine 27 generally operates during processing. For example, policies 29 may define various configuration settings and other information that include such operating parameters as which applications to decode, particular source and destination devices to monitor or ignore, rules to apply to traffic from specific source and/or destination devices, which IDP services should be applied to particular packet flows, etc. As described in greater detail below, policies 29 may be generated to define which of protocol decoders 30 are enabled or disabled, and disabled protocol decoders 30 may be excluded from one or more policies 29. Disabling the protocol decoder may, for example, prevent processing engine 27 from invoking that particular decoder when a packet flow is received that would otherwise be analyzed using the disabled protocol decoder. Rather than invoking the disabled protocol decoder, the processing engine may instead perform a predetermined action, such as allowing the packets to pass through, automatically dropping the packets, or some other configurable response.

Protocol decoders 30 may include a set of one or more protocol-specific software modules that process application-layer communications 32 and output transaction data 34 that identifies application-layer transactions. In particular, transaction data 34 may indicate when a series of related application-layer communications between two peer devices start and end. In one example, one or more of protocol decoders 30 may be generic protocol decoders, such that the generic protocol decoders attempt to identify the application corresponding to the payload of an application-layer communication 32. An example of a generic protocol decoder is an algorithm that matches a predefined set of application fingerprints/signatures to the data being decoded and identifies the application based on a particular fingerprint match. For example, a generic protocol decoder may attempt to identify the application corresponding to the payload of an HTTP communication.

Many of protocol decoders 30 correspond to a different communication protocol or service. Examples of communication protocols that may be supported by protocol decoders 30 include the HyperText Transfer Protocol (HTTP), the File Transfer Protocol (FTP), the Network News Transfer Protocol (NNTP), the Simple Mail Transfer Protocol (SMTP), Telnet, Domain Name System (DNS), Gopher, Finger, the Post Office Protocol (POP), the Secure Socket Layer (SSL) protocol, the Lightweight Directory Access Protocol (LDAP), Secure Shell (SSH), Server Message Block (SMB), and other protocols. In one example, each of protocol decoders 30 receives data via a universal software interface, i.e., a software interface that processes application data in a manner that is independent from the underlying transport mechanism. In this way, protocol decoders may be swapped, reused, and stacked (layered) when applied to a given packet flow.

After application of protocol decoders 30 to a given packet flow or individual packet, the protocol decoders return transaction data 34, application-layer elements 36, and protocol anomaly data 38 to stateful inspection engine 28. Stateful inspection engine 28 applies attack definitions 33 to protocol-specific application-layer elements 36 and anomaly data 38 to detect and prevent network attacks and other security risks.

In most cases, IDP 20 generally continues processing packets according to the procedures described above. However, in some instances a process exception may occur while IDP 20 is processing the packets. In such instances, exception handling module 46 of IDP 20 may gracefully handle the exception to allow IDP 20 to continue normal processing, e.g., by preventing the IDP software from terminating.

During processing, exception handling module 46 actively monitors the IDP software to determine whether an exception has been thrown. When such an exception is detected, exception handling module 46 may first determine whether the exception was caused by one of protocol decoders 30. For example, exception handling module 46 may determine the memory location associated with the exception, e.g., by obtaining an instruction pointer of the process exception using the techniques described in further detail in connection with FIG. 4, and may compare that memory location with a memory space that is associated with one or more of protocol decoders 30. If the memory location of the exception falls within the memory space associated with protocol decoders 30, then one of the protocol decoders 30 caused the process exception, either directly or indirectly. This information may then be used to determine an approach for handling the process exception. If the exception was caused by one of protocol decoders 30, exception handling module 46 may cause the IDP software to jump from the process stack of the faulty decoder to a portion of the process that is known to be stable. In such a manner, exception handling module 46 prevents the IDP software from crashing.

In some implementations, exception handling module 46 may also identify the specific decoder that caused the exception. For example, exception handling module 46 may obtain packet flow information associated with the packet being processed at the time of the process exception by querying flow table 35, and may analyze the packet flow information to determine which of the protocol decoders was actively processing the packet. In some implementations, the packet flow information may include, for example, a five-tuple for the packet flow that includes a source IP address, a destination IP address, a source port, a destination port, and a protocol. The packet flow information may also include a VLAN identifier associated with the packet flow. The packet flow information may also include the specific application that has been identified as being associated with the packet flow. In some implementations, the packet flow information may also include user-role information corresponding to the source IP, e.g., the user or type of user that is associated with that particular source IP, and the role or category that is associated with that particular user or type of user. Any of this packet flow information, or other identifying characteristics related to the packet flow, may be used to identify the protocol decoder that was processing the packet at the time the process exception occurred.

After identifying the specific decoder that caused the exception, exception handling module 46 may disable the decoder, e.g., by disabling any further service-specific processing that would be otherwise be handled by the decoder. After the decoder has been disabled, IDP 20 may process packets that would otherwise have been decoded using the decoder in any of a number of manners, depending on the particular implementation. For example, in one implementation, packets that are associated with a disabled decoder may simply be passed through by IDP 20 without further processing. In another implementation, packets that are associated with a disabled decoder may be summarily dropped by IDP 20. In other implementations, different responses may be applied to different packets. For example, if a particular type of packet associated with a disabled decoder is generally associated with malicious attacks, the packets may be dropped, while other packets that are less often associated with malicious attacks may be passed without further processing.

Figure 3:
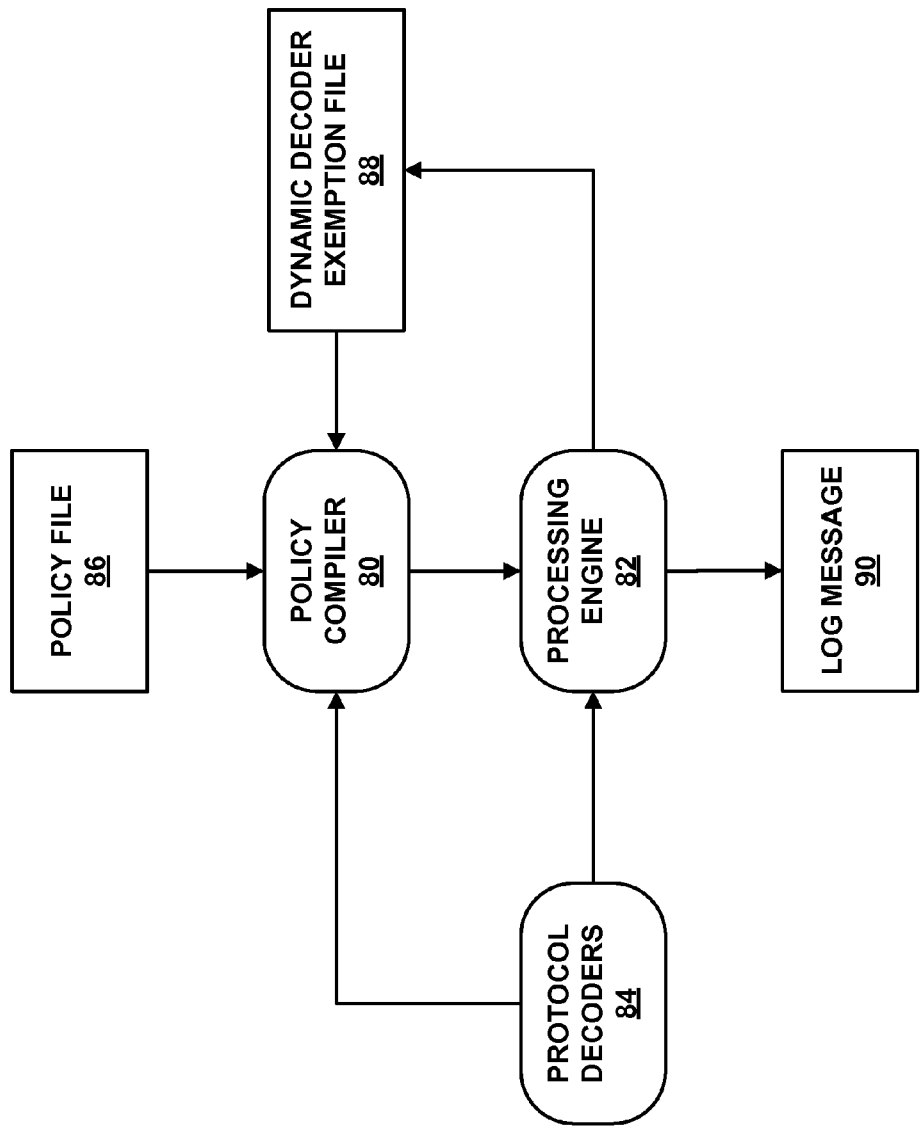
FIG. 3 is a block diagram illustrating an example architecture for compiling a policy for use by a processing engine of an IDP device.

FIG. 3 is a block diagram illustrating an example architecture for compiling a policy for use by a processing engine of an IDP device. In the example architecture, policy compiler 80 receives inputs of one or more protocol decoders 84, a policy file 86, and a dynamic decoder exemption file 88. Policy compiler 80 uses these inputs, and any additional information provided by an administrator, e.g., from administrator 42 via security management module 44, to compile a rulebase that configures how processing engine 82 generally operates during processing.

As one example, a policy file 86 may include various configuration settings and other information that define such operating parameters as which applications to decode, particular source and destination devices to monitor or ignore, rules to apply to traffic from specific source and/or destination devices, which IDP services should be applied to particular packet flows, etc. The information contained in policy file 86 may be relatively static in that it may remain consistent during normal processing, or may be updated relatively infrequently. For example, policy file 86 may remain static until an administrator updates the file and pushes the new updates to be compiled by policy compiler 80, and applied to processing engine 82.

In general, when a new policy is submitted to policy compiler 80 to be pushed to processing engine 82, the new policy pushed to the engine overrides any previous configurations that were applied to processing engine 82, including any changes that were applied by processing engine 82 during processing. For example, if processing engine 82 disabled one or more protocol decoders in response to an exception thrown during processing, as is described in greater detail above, a new policy that is compiled may generally override the disabling of the one or more protocol decoders, and the disabled decoders may therefore be unintentionally re-enabled.

According to the techniques of this disclosure, dynamic decoder exemption file 88 may be used to prevent the disabled decoders from unintentionally being re-enabled. Although dynamic decoder exemption file 88 is generally described as an electronic file, it should be understood that the information contained in dynamic decoder exemption file 88 may alternatively be stored in different formats that are accessible by policy compiler 80, such as a memory buffer, or the like. Dynamic decoder exemption file 88 may be used to maintain a collection (e.g., a list or a database) of rules corresponding to decoders that have been disabled during processing such that those decoders are not unintentionally re-enabled when a new policy is compiled by policy compiler 80. In other words, when policy compiler 80 receives a new policy file 86 that is to be compiled and applied to processing engine 82, policy compiler 80 may first extract information from dynamic decoder exemption file 88 to determine whether one or more of protocol decoders 84 have been disabled, and may ensure that such decoders remain disabled when the new policy is pushed to processing engine 82. For example, policy compiler 80 may exclude any decoders that had been previously disabled from the new policy.

In some implementations, policy compiler 80 may automatically compile a new policy upon detection of a change in dynamic decoder exemption file 88. For example, a flag may be set to indicate whether dynamic decoder exemption file 88 has been newly created or changed since being used by policy compiler 80, and upon detection of the flag, e.g., by a policy loading daemon that monitors the status of the flag, policy compiler 80 may compile a new rulebase to be pushed to processing engine 82.

The term "unintentionally" is used above to differentiate from the intentional re-enabling of decoders, e.g., such as by a manual override from an administrator who has purposely decided to re-enable one or more previously disabled decoders. In the case of intentional re-enabling of one or more decoders, dynamic decoder exemption file 88 may be modified to reflect the decision of the administrator to intentionally re-enable the decoders, e.g., by removing the re-enabled decoders from the file, or by otherwise indicating the decision to re-enable the decoders.

In some implementations, dynamic decoder exemption file 88 may be generated or updated based on information related to an exception that occurred during processing of processing engine 82, e.g., an exception that was thrown by one of protocol decoders 84. As described herein, when an IDP detects an exception that was caused by a decoder during processing, processing engine 82 may generate or update dynamic decoder exemption file 88 using packet flow information related to the packet that was being processed when the process exception was thrown. In some implementations, such packet flow information may be retrieved from flow table 35 (FIG. 2). The packet flow information may include, for example, a five-tuple for the packet flow of the packet including a source IP address, a destination IP address, a source port, a destination port, and a protocol. The packet flow information may also include a VLAN identifier associated with the packet flow. The packet flow information may also include the specific application that has been identified as being associated with the packet flow. In some implementations, the packet flow information may also include user-role information corresponding to the source IP, e.g., the user or type of user that is associated with that particular source IP, and the role or category that is associated with that particular user or type of user. Any of the packet flow information, as well as other information available to processing engine 82 about the exception, e.g., timing of the fault, hardware or software configuration information, or the like, may be included in dynamic decoder exemption file 88, depending on the particular implementation that is used.

Dynamic decoder exemption file 88 may then be used by policy compiler 80 to enable or disable one or more of protocol decoders 84 when pushing a new policy to processing engine 82. In one example, any protocol decoder 84 that is included in dynamic decoder exemption file 88 at the time of a policy compilation may be disabled in the new policy. In another example, policy compiler 80 or dynamic decoder exemption file 88 may include configurable rules that define how certain disabled decoders included in the file should be handled. In another example, dynamic decoder exemption file 88 may include version information associated with protocol decoders 84, and if a new version of a previously disabled protocol decoder 84 is provided to the IDP, policy compiler 80 may re-enable the decoder, and may remove the decoder exemption for that particular decoder from the file. Such behavior may be based on the assumption that a new version of a previously faulty protocol decoder presumably fixed any problems with the protocol decoder.

During execution, processing engine 82 may also generate log message 90. Log message 90 may provide information about one or more process exceptions that occurred during processing. For example, log message 90 may identify the specific decoder that caused the exception, the memory location of the exception, memory stack information that immediately preceded the exception, the version of the decoder, and/or any packet flow information associated with the exception. In some implementations, log message 90 may be stored, e.g., in a log file, and/or transmitted to a user, e.g., administrator 42, to allow further analysis of the cause and/or consequences of the process exception. The information contained in log message 90 may be configurable to provide more, less, or different types of information, depending on how the messages are to be utilized in a given implementation. In some implementations, the log messages may be customized for or otherwise tailored towards the different entities to which the messages are sent.

Figure 4:
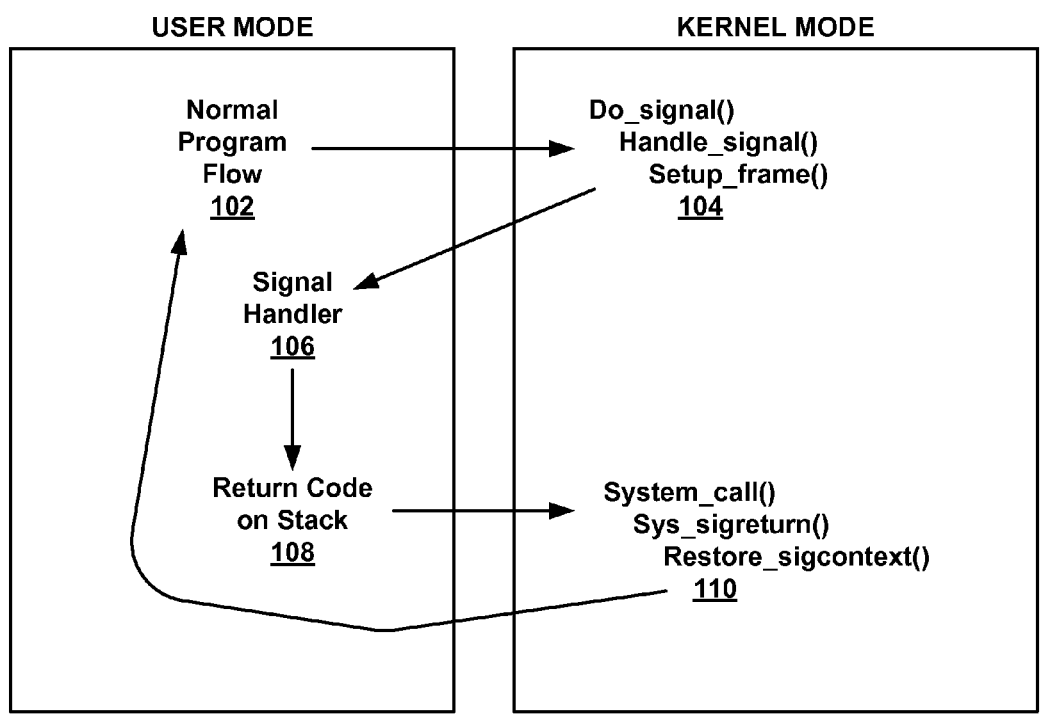
FIG. 4 is a conceptual diagram illustrating example functions for obtaining an instruction pointer of a process exception.

FIG. 4 is a conceptual diagram illustrating example functions for obtaining an instruction pointer of a process exception, e.g., a process exception occurring on an IDP device. According to the techniques described in this disclosure, the instruction pointer may then be used to determine whether the process exception was caused, either directly or indirectly, by one of the protocol decoders of the IDP software. In general, the instruction pointer is obtained using kernel stack manipulation, e.g., the kernel internal stack manipulation mechanism provided in Linux, as described in greater detail below.

Signal handler 106, which may be invoked by exception handling module 46 when a process exception is thrown during processing of the IDP software, operates in a user mode context. As described below, signal handler 106 may be used to obtain the instruction pointer of the process exception by querying a kernel mode context for an instruction pointer at which the process exception occurred. This instruction pointer may then be used by exception handling module 46 to determine whether the process exception was caused by one of the protocol decoders or by the processing engine. Signal handler 106 may also be used to set a flag that indicates that an exception has been thrown, and to cause the processing to execute a programmatic jump to a portion of the process that is considered stable, e.g., a long jump out of the current process stack that caused the exception, and back to a more stable stage of the IDP software. In general, signal handlers are functions defined by user mode processes that are included in the user mode code segment.

When an interrupt or other exception is thrown during normal program flow 102, processing may pass from a user mode context to a kernel mode context. Following any appropriate processing in the kernel mode, but before switching contexts back to the user mode, the kernel may employ pseudocode 104 to execute a Do_signal( ) function, which in turn handles the exception or interrupt signal, e.g., by invoking the Handle_signal( ) function, and sets up a frame data structure to be passed to the user mode stack, e.g., by invoking the Setup_frame( ) function.

The frame data structure may contain information that can be used by signal handler 106 to handle the signal and to ensure that processing returns to the Sys_sigreturn( ) function shown in pseudocode 110. The frame data structure may include multiple fields including, for example, a "Pretcode" field that contains the return address of signal handler 106, and which points to the code to call the Sys_sigreturn( ) function, an "Sc" field that contains the hardware context of the user mode process just before switching to kernel mode, and a "Retcode" field that contains a signature of the frame.

The frame data structure is passed to signal handler 106, which operates in the user mode context. When signal handler 106 is called, the signal handler stack frame, which includes the frame data structure that was pushed from the kernel, is pushed to the top of the current user mode stack. Signal handler 106 defines a local variable, which is in the topmost frame of the user mode stack, with the lowest memory address on the stack. Starting from this lowest memory address, signal handler 106 scans the entire user mode stack for the frame signature contained in the "Retcode" field of the frame data structure. Upon reaching the frame signature, signal handler 106 determines the beginning of the frame data structure by subtracting the memory address location just after the frame signature from the size of the frame data structure. Then, signal handler 106 can access the "Sc" field of the frame data structure to obtain the instruction pointer to where the process exception occurred.

When the signal handler function terminates, the return code 108 placed on the user mode stack by the Setup_frame( ) function is executed. This invokes the Sys_sigreturn( ) system call in kernel mode, and the corresponding service routine of the function copies the hardware context of the normal program to the kernel mode stack and restores the user mode stack back to its original state, e.g., by invoking the Restore_sigcontext( ) function. When the System_call( ) function terminates, the normal program may resume its execution.

Figure 5:
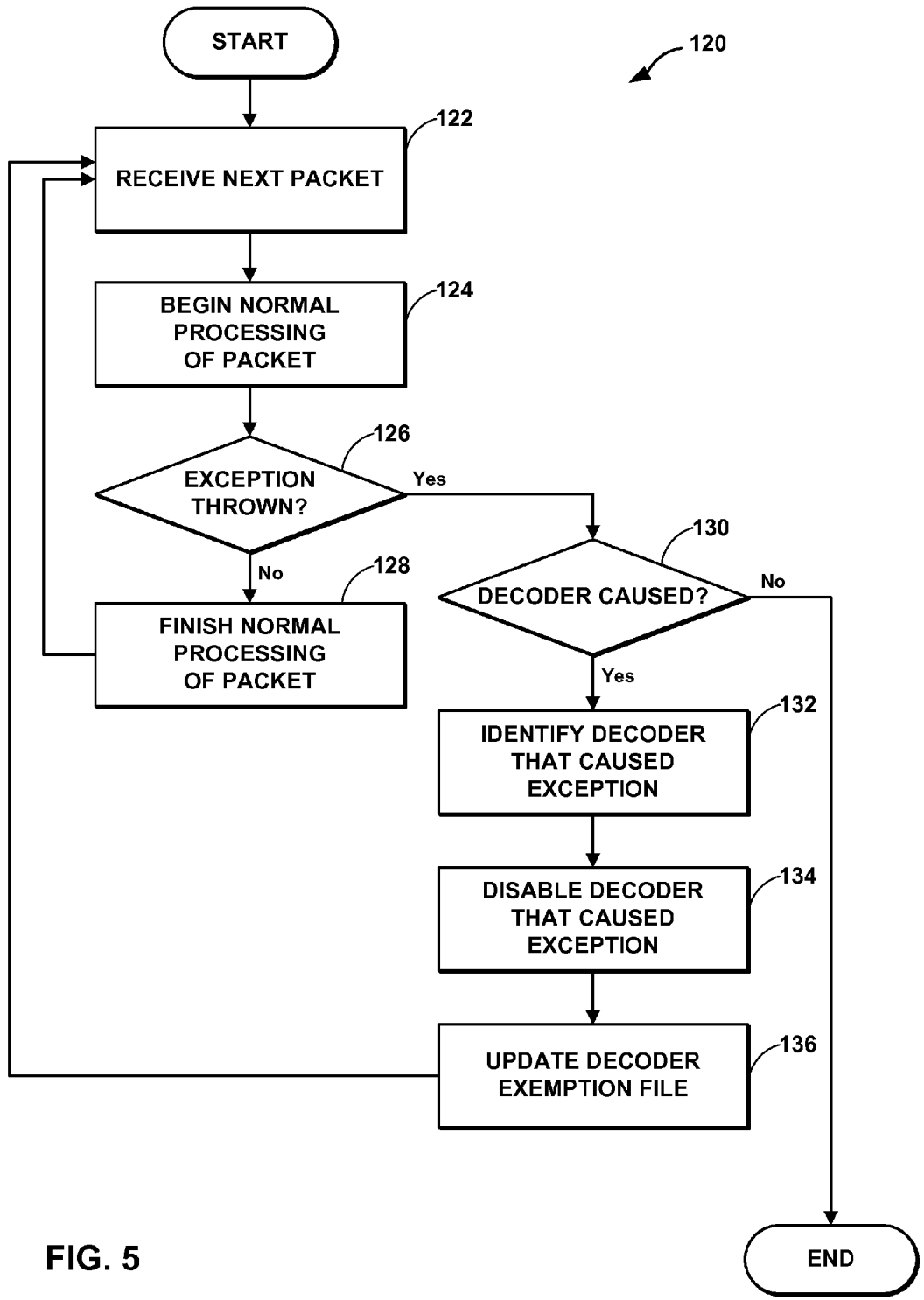
FIG. 5 is a flowchart illustrating an example process for continuing execution of IDP software upon encountering a process exception.

FIG. 5 is a flowchart illustrating an example process 120 for continuing execution of IDP software upon encountering a process exception. Process 120 may be used, for example, by an IDP device, e.g. IDP 20, to provide dynamic resilience against crashes when a process exception is thrown by one or more protocol decoders during IDP processing of packet flows. Although process 120 is generally discussed with respect to IDP 20, it should be understood that any IDS, IDP, IPS, or other security device may implement process 120.

Normal processing of packets to identify potentially malicious attacks using IDP 20 is shown on the left side of the flowchart. During normal processing, a packet of a packet flow, e.g., inbound traffic 24, is received by IDP 20 (122). IDP 20 then begins normal processing of the packet (124). For example, IDP 20 may reassemble application-layer data of the packet flow by buffering packets of the packet flow, may invoke one or more protocol decoders 30 to determine one or more protocols associated with the packet flow, e.g., by analyzing the application-layer data or other data of the packet flow, and may attempt to detect certain types of malicious attacks as described in greater detail above. Throughout the normal processing of the packet, IDP 20 may continuously monitor the IDP software to determine whether an exception has been thrown during processing (126). If not, then IDP 20 finishes the normal processing of the packet (128), and process 120 continues by receiving the next packet (122). As such, during normal processing, process 120 may continuously receive and process packets to identify malicious attacks on the network.

In some cases, an exception may be thrown during normal processing that may, if not handled according to the techniques of this disclosure, cause the IDP software, including the processing engine and the protocol decoders, to terminate. In those cases, in accordance with the techniques described in this disclosure, IDP 20 attempts to determine whether the exception was caused by one of protocol decoders 30 (130). For example, IDP 20 may identify the memory location associated with the process exception, e.g., by utilizing the pseudocode example of FIG. 4, and may compare that memory location with a memory space that is associated with one or more of protocol decoders 30. If the memory location of the exception falls within the memory space associated with protocol decoders 30, then one of the protocol decoders 30 caused the process exception, either directly or indirectly. If not, then the exception may have been caused by the processing engine or some other process executing on IDP 20 rather than having been caused by one of the protocol decoders 30. If the exception was not caused by one of protocol decoders 30, then process 120 may end. In other implementations, process 120 may continue to a separate exception handling routine to attempt to recover from any exceptions that were not caused by a decoder.

If the exception was caused by one of the protocol decoders, IDP 20 may then identify the specific decoder that caused the exception (132). For example, IDP 20 may analyze packet flow information associated with the packet being processed at the time of the process exception to determine which of the protocol decoders was actively processing the packet. In some implementations, the packet flow information may include, for example, a five-tuple for the packet flow that includes a source IP address, a destination IP address, a source port, a destination port, and a protocol. The packet flow information may also include the VLAN identifier associated with the packet flow. The packet flow information may also include the specific application that has been identified as being associated with the packet flow. In some implementations, the packet flow information may also include user-role information corresponding to the source IP, e.g., the user or type of user that is associated with that particular source IP, and the role or category that is associated with that particular user or type of user. Any of this packet flow information, or other identifying characteristics related to the packet flow, may be used to identify the protocol decoder that was processing the packet at the time the process exception occurred.

After identifying the specific decoder that caused the exception, IDP 20 may disable the decoder (134), and the IDP engine may process packets that would otherwise have been decoded using the now-disabled decoder in any of a number of manners, depending on the particular implementation. For example, in one implementation, packets that are associated with a disabled decoder may simply be passed through by IDP 20 without further processing. In another implementation, packets that are associated with a disabled decoder may be dropped. In other implementations, different responses may be applied to different packets. For example, if a particular type of packet associated with a disabled decoder is generally associated with malicious attacks, the packets may be dropped, while other packets that are less often associated with malicious attacks may be passed without further processing.

In addition to disabling the decoder that caused the process exception, IDP 20 may also update a decoder exemption file (136). As described above, a decoder exemption file, e.g., dynamic decoder exemption file 88 of FIG. 3, may be used to prevent the disabled decoder from unintentionally being re-enabled when a new policy is pushed to the IDP engine.

As shown in FIG. 5, example process 120 allows the IDP software to continue processing packets in a normal fashion even if one or more of the protocol decoders of IDP 20 has failed or otherwise thrown an exception during processing. In some implementations, IDP 120 may utilize a programmatic jump, e.g., a long jump, to a predetermined execution point of the IDP software to recover from the exception. For example, the programmatic jump may be to a stage of the process that is identified as being stable. In some implementations, the programmatic jump may cause the processing to continue at a stage where IDP 20 is ready to begin receiving the next packet (122). In another implementation, the programmatic jump may cause the IDP software to continue at a point in the process preceding receipt of the next packet, e.g., to allow IDP 20 to handle any additional procedures that may be useful following an exception, and before continuing the processing. For example, the programmatic jump may be to a point in example process 120 just after determining that the decoder caused the exception (130) and before identifying the particular decoder that caused the exception (132).

Figure 6:
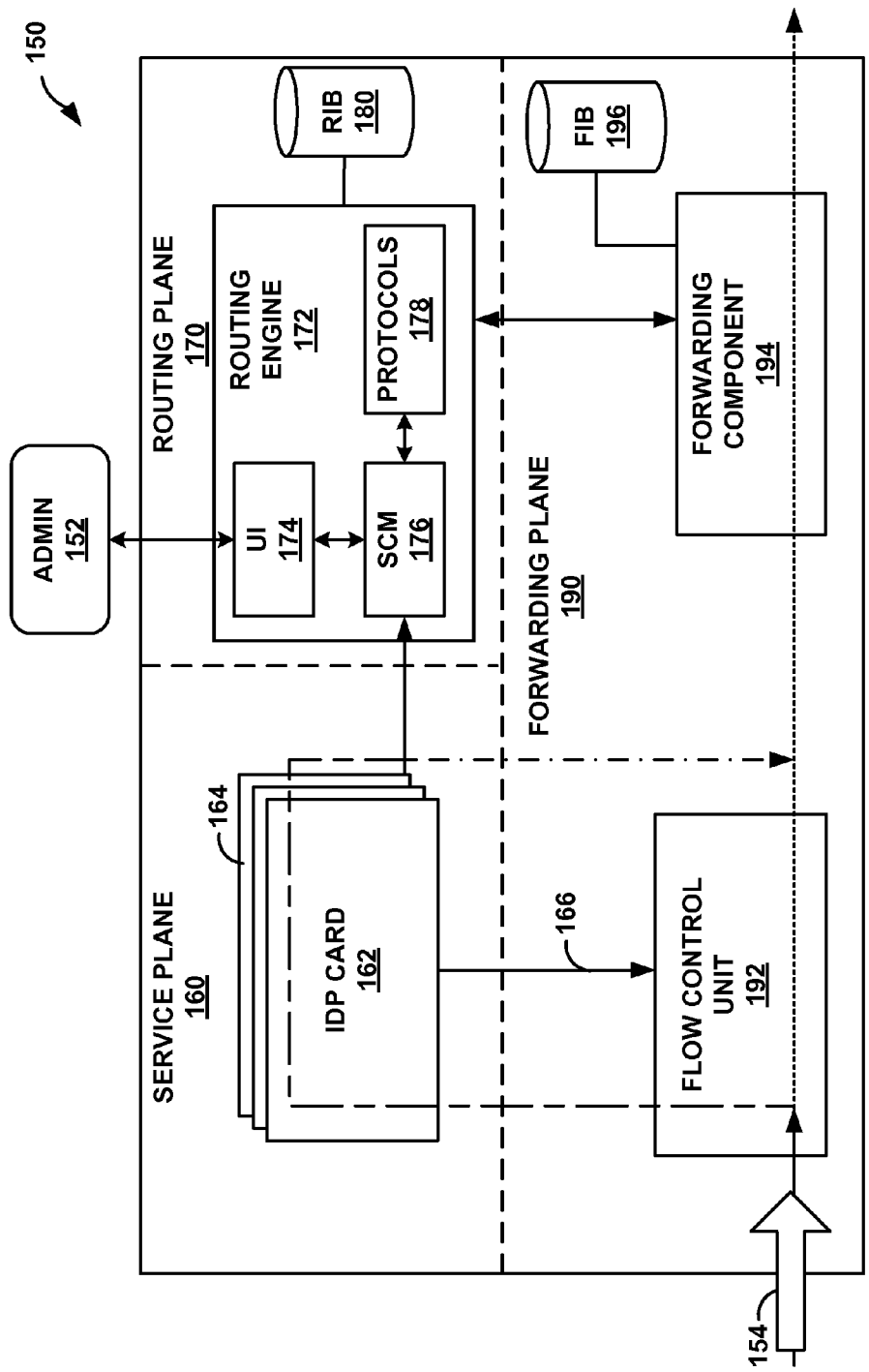
FIG. 6 is a block diagram illustrating an example of a router that includes a service plane card that performs the techniques of this disclosure.

FIG. 6 is a block diagram illustrating an example of a router 150 that includes a service plane card that performs the techniques of this disclosure. In the example of FIG. 6, router 150 comprises distinct "planes" that perform different tasks for router 150. In general, router 150 includes forwarding plane 190 that receives and/or sends packets, routing plane 170 that is dedicated to routing functionality (such as calculating routes through a network), and service plane 160 that includes a plurality of service cards 164 that each perform various miscellaneous tasks for router 150. In general, service cards 164 may extend the functionality of router 150 to perform additional functions for router 150. Service cards 164 may be removed and replaced with other cards that perform other functions.

In the example of FIG. 6, service plane cards 164 include IDP card 162 that generally performs the functions described with respect to IDP 20 (FIG. 2). That is, IDP card 162 may include a network interface to receive packets of a network session, a control unit having one or more processors, a reassembly module executing within the control unit to assemble application-layer data for the network session, and an attack detection module executing within the control unit to perform a programmed response when the network session is determined to be originated by an automated software agent. IDP card 162 may also include an exception handling module that detects process exceptions that occur during IDP processing, and handles the process exceptions according to the techniques described herein to allow the IDP software to continue processing incoming packets. Service cards 164 may additionally include, for example, a firewall card, a security management card, a user interface card, an additional network interface, or other cards.

Service cards 164 also send messages 166 to flow control unit 192. In one example, IDP card 162 sends messages 166 comprising instructions for a particular packet flow. That is, IDP card 162 may instruct flow control unit 192 to drop packets of a packet flow, to send a close session message to a client or a server of a packet flow, or to stop sending packets of a packet flow to IDP card 162 after determining that the packet flow is not malicious. Other service cards 164 may also send similar messages 166 to flow control unit 192.

Router 150 also includes routing plane 170 in which router 150 performs various routing tasks. For example, routing engine 172 of routing plane 170 calculates routes through a network to which router 150 is connected according to one or more protocols 178. Router 150 also receives advertised routes from other routers via service communication module (SCM) 176. Routing engine 172 stores advertised and calculated routes in routing information base (RIB) 180. Routing engine 172 also sends updates to forwarding component 194 according to advertised and calculated routes, such that forwarding component 194 may properly forward received packets along a route calculated by routing engine 172.

In the example of FIG. 6, routing engine 172 also includes user interface (UI) 174. UI 174 enables administrator (admin) 152 to interact with router 150, e.g., to add to or update protocols 178. In some examples, administrator 152 configures service plane cards 164, such as IDP card 162, using UI 174. For example, UI 174 may allow administrator 152 to configure IDP card 162, e.g., by providing policy information, manual override commands, or other configuration settings. UI 174 may also communicate other configuration settings to service cards 164 through service communication module 176.

Forwarding plane 190 generally receives and forwards packets for router 150. Flow control unit 192 receives packets 154 of various packet flows or other network sessions. When flow control unit 192 receives a message intended for routing engine 172, flow control unit 192 directs the message to routing engine 172, e.g., through one of service cards 164. Flow control unit 192 directs certain packets through one or more service cards 164. Flow control unit 192 may also send received packets directly to forwarding component 194. When IDP card 162 has sent a message 166 to flow control unit 192 to block packets of a particular packet flow, flow control unit 192 drops received packets 154 of that packet flow.

Forwarding component 194 forwards packets of a network session to another network device. Forwarding component 194 also maintains forwarding information base (FIB) 196 according to messages received from routing engine 172. When routing engine 172 advertises a route, forwarding component 194 forwards the advertised route to one or more other routers with which router 150 is in communication.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

In one example, a service plane card may include a hardware control unit that performs the techniques described in this disclosure, such that the service plane card may be inserted into a multi-chassis network device. In this manner, by connecting a service plane chassis that implements these techniques to an extensible multi-chassis network device, the multi-chassis network device may incorporate the techniques of this disclosure with the functionality of other chassis connected to the multi-chassis network device. For example, a router may be configured to perform the techniques of this disclosure by connecting a service plane chassis that performs these techniques to the router.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

The invention claimed is:

1. A method comprising:
   receiving, with a network device, a packet of a packet flow within a network;
   processing the packet using intrusion detection software executing on the network device to determine whether the packet flow represents a network attack, the intrusion detection software comprising a processing engine and a plurality of protocol decoders;
   detecting a process exception that occurs during processing of the packet;
   identifying a memory location associated with the process exception;
   determining whether the process exception was caused by one of the plurality of protocol decoders or the processing engine based on the memory location associated with the process exception;
   determining that the process exception was caused by one of the plurality of protocol decoders:
   handling the process exception and continuing execution of the intrusion detection software;
   determining which one of the plurality of protocol decoders caused the process exception based on packet flow information associated with the packet being processed when the process exception occurred;
   disabling the decoder that caused the process exception;
   storing information identifying a collection of exempt decoders including the disabled decoder and any other previously disabled decoders;
   compiling, with the network device, a new policy of the decoders to be applied to the processing engine based at least in part on the stored collection, wherein the new policy excludes the exempt decoders; and
   removing, with the network device, one of the disabled decoders from the collection of exempt decoders upon detecting that an updated version for the one the disabled decoder is available for the intrusion detection software.

2. The method of claim 1, wherein identifying the memory location associated with the process exception comprises querying a kernel for an instruction pointer at which the process exception occurred.

3. The method of claim 1, wherein determining whether the process exception was caused by one of the plurality of protocol decoders comprises comparing the memory location to a memory space associated with the plurality of protocol decoders.

4. The method of claim 1, wherein handling the process exception comprises performing a programmatic jump to a predetermined execution point of the intrusion detection software.

5. The method of claim 1, wherein the packet flow information comprises a fivetuple for the packet flow, the fivetuple comprising a source internet protocol (IP) address, a destination IP address, a source port, a destination port, and a protocol.

6. The method of claim 5, wherein the packet flow information comprises a virtual local area network (VLAN) identifier.

7. The method of claim 1, further comprising:
   receiving a subsequent packet of a subsequent packet flow within the network;
   determining that the subsequent packet is associated with the disabled protocol decoder; and
   processing the subsequent packet using a predetermined response.

8. The method of claim 7, wherein the predetermined response comprises passing the subsequent packet through the network device.

9. The method of claim 7, wherein the predetermined response comprises dropping the subsequent packet from the network device.

10. A network device comprising:
    a network interface receiving a packet of a packet flow, a control unit having one or more processors;
    a processing engine executing within the control unit to process the packet to determine whether the packet flow represents a network attack;
    a plurality of protocol decoders invoked by the processing engine;
    a collection of one or more exempt decoders that have been disabled; a policy compiler to compile a policy to control invocation of the policy decoders by the processing engine, wherein the policy compiler generates the policy to exclude the exempt decoders from invocation by the processing engine; and
    an exception handling module executing within the control unit,
    wherein, upon detecting a process exception that occurs during processing of the packet, the exception handling module identifies a memory location associated with the process exception, determines whether the process exception was caused by one of the plurality of protocol decoders or the processing engine based on the memory location associated with the process exception, determining that the process exception was caused by one of the plurality of protocol decoders, handles the process exception and continues processing using the processing engine,
    wherein the exception handling modules determines which one of the plurality of protocol decoders caused the process exception based on packet flow information associated with the packet being processed when the process exception occurred and adds the decoder that caused the process exception to the collection of exempt decoders, and wherein the policy compiler removes one of the disabled decoders from the collection of exempt decoders upon determining that an updated version of the decoder is available.

11. The network device of claim 10, wherein the exception handling module identifies the memory location associated with the process exception by querying a kernel for an instruction pointer at which the process exception occurred.

12. The network device of claim 10, wherein the exception handling module determines whether the process exception was caused by one of the plurality of protocol decoders by comparing the memory location to a memory space associated with the plurality of protocol decoders.

13. The network device of claim 10, wherein handling the process exception comprises performing a programmatic jump to a predetermined execution point of the processing engine.

14. The network device of claim 10, wherein the packet flow information comprises a five-tuple for the packet flow, the five-tuple comprising a source internet protocol (IP) address, a destination IP address, a source port, a destination port, and a protocol.

15. The network device of claim 14, wherein the packet flow information comprises a virtual local area network (VLAN) identifier.

16. A computer-readable storage device comprising instructions that, when executed, cause one or more processors of a network device to:
- receive a packet of a packet flow within a network;
- process the packet using intrusion detection software to determine whether the packet flow represents a network attack, the intrusion detection software comprising a processing engine and a plurality of protocol decoders;
- detect a process exception that occurs during processing of the packet;
- identify a memory location associated with the process exception;
- determine whether the process exception was caused by one of the plurality of protocol decoders or the processing engine based on the memory location associated with the process exception;
- determining that the process exception was caused by one of the plurality of protocol decoders;
- handle the process exception and continue execution of the intrusion detection software;
- determine which one of the plurality of protocol decoders caused the process exception based on packet flow information associated with the packet being processed when the process exception occurred;
- disable the decoder that caused the process exception;
- store information identifying a collection of exempt decoders including the disabled decoder and any other previously disabled decoders;
- compile, with the network device, a new policy of the decoders to be applied to the processing engine based at least in part on the stored collection, wherein the new policy excludes the exempt decoders; and
- remove, with the network device, one of the disabled decoders from the collection of exempt decoders upon detecting that an updated version for the one the disabled decoder is available.

17. The computer-readable storage device of claim 16, wherein identifying the memory location associated with the process exception comprises querying a kernel for an instruction pointer at which the process exception occurred.

18. The computer-readable storage device of claim 16, wherein determining whether the process exception was caused by one of the plurality of protocol decoders comprises comparing the memory location to a memory space associated with the plurality of protocol decoders.

19. The computer-readable storage device of claim 16, wherein handling the process exception comprises performing a programmatic jump to a predetermined execution point of the intrusion detection software.

20. The computer-readable storage device of claim 16, wherein the packet flow information comprises a five-tuple for the packet flow, the five-tuple comprising a source internet protocol (IP) address, a destination IP address, a source port, a destination port, and a protocol.

21. The computer-readable storage device of claim 20, wherein the packet flow information comprises a virtual local area network (VLAN) identifier.

* * * * *